US012784554B2

(12) United States Patent
Excoffier

(10) Patent No.: US 12,784,554 B2
(45) Date of Patent: Nov. 3, 2026

(54) METHOD FOR MANAGING ENERGY, AND CORRESPONDING ELECTRONIC DEVICE AND COMPUTER PROGRAM

(71) Applicant: Orange, Issy-les-Moulineaux (FR)

(72) Inventor: David Excoffier, Chatillon Cedex (FR)

(73) Assignee: Orange, Issy-les-Moulineaux (FR)

( * ) Notice: Subject to any disclaimer, the term of this patent is extended or adjusted under 35 U.S.C. 154(b) by 51 days.

(21) Appl. No.: 18/848,293

(22) PCT Filed: Mar. 15, 2023

(86) PCT No.: PCT/EP2023/056556
§ 371 (c)(1),
(2) Date: Sep. 18, 2024

(87) PCT Pub. No.: WO2023/174979
PCT Pub. Date: Sep. 21, 2023

(65) Prior Publication Data

US 2026/0051230 A1 Feb. 19, 2026

(30) Foreign Application Priority Data

Mar. 18, 2022 (FR) ....................................... 2202429

(51) Int. Cl.
*G08B 5/22* (2006.01)
*G08B 21/18* (2006.01)

(52) U.S. Cl.
CPC ............. *G08B 5/22* (2013.01); *G08B 21/182* (2013.01)

(58) Field of Classification Search
CPC .......... G08B 5/22; G08B 21/182; G08B 7/06; H02J 50/001; H02J 50/20; H02J 50/30;
(Continued)

(56) References Cited

U.S. PATENT DOCUMENTS 7,649,472 B1 * 1/2010 Paterno .................... G08B 7/06 340/815.45
2006/0085167 A1 * 4/2006 Warfield ................ H02S 50/10 702/188

(Continued)

FOREIGN PATENT DOCUMENTS

FR 3118524 A1 7/2022
FR 3124683 A1 3/2024

(Continued)

OTHER PUBLICATIONS

International Search Report for International Application No. PCT/EP2023/056556 dated May 19, 2023.

*Primary Examiner* — Adnan Aziz
(74) *Attorney, Agent, or Firm* — Knobbe, Martens, Olson & Bear, LLP

(57) ABSTRACT

A method for managing energy, and corresponding electronic device and computer program. The method for managing energy implemented by an electronic device includes: obtaining at least one value of ambient energy of a first type, representative of an exposure of a first piece of equipment to the ambient energy; and providing at least one recommendation relating to at least one candidate conversion element suitable for converting an ambient energy of the first type into energy of a second type useable to power the first piece of equipment, the at least one recommendation taking into account the at least one obtained value of ambient energy of the first type.

19 Claims, 3 Drawing Sheets

(58) Field of Classification Search
CPC ...... H02J 3/381; H02J 3/32; H02J 3/38; H02J 3/46; H02J 2300/26; F05B 2220/708; F24F 11/46; F24F 11/52; F24F 2140/60; Y02E 10/76; Y02E 10/56; Y02B 10/30
See application file for complete search history.

(56) References Cited

U.S. PATENT DOCUMENTS

| | | | | |
|---|---|---|---|---|
| 2010/0043869 | A1* | 2/2010 | Bennett | H10F 55/17 136/251 |
| 2011/0032695 | A1* | 2/2011 | Cumberland | F21S 9/032 362/183 |
| 2011/0037600 | A1* | 2/2011 | Takehara | H04Q 9/00 136/244 |
| 2011/0213506 | A1* | 9/2011 | Gamboa Tuesta | F03D 9/007 700/287 |
| 2014/0265585 | A1* | 9/2014 | Della Sera | H02J 3/38 320/101 |
| 2015/0001201 | A1* | 1/2015 | Adler | H02J 7/35 320/101 |
| 2015/0189705 | A1* | 7/2015 | Ghosh | H02J 3/466 315/161 |
| 2016/0212506 | A1* | 7/2016 | Norwood | H02J 13/00017 |
| 2016/0224702 | A1* | 8/2016 | Ma | G05F 1/66 |
| 2017/0331325 | A1 | 11/2017 | Ristau | |
| 2020/0091733 | A1 | 3/2020 | Peterson | |
| 2020/0176988 | A1* | 6/2020 | Webb | H02J 7/0048 |
| 2021/0226271 | A1* | 7/2021 | Lu | G06F 1/263 |

FOREIGN PATENT DOCUMENTS

| | | |
|---|---|---|
| WO | WO 2014/068591 A1 | 5/2014 |
| WO | WO 2018/222536 A1 | 12/2018 |

* cited by examiner

METHOD FOR MANAGING ENERGY, AND CORRESPONDING ELECTRONIC DEVICE AND COMPUTER PROGRAM

CROSS-REFERENCE TO RELATED APPLICATIONS

This application is filed under 35 U.S.C. § 371 as the U.S. National Phase of Application No. PCT/EP2023/056556 entitled "METHOD FOR MANAGING ENERGY, AND CORRESPONDING ELECTRONIC DEVICE AND COMPUTER PROGRAM" and filed Mar. 15, 2023, and which claims priority to FR 2202429 filed Mar. 18, 2022, each of which is incorporated by reference in its entirety.

BACKGROUND

Field

The field of the development is that of equipment belonging in particular to the Internet of Things (or IoT), commonly known as "connected objects" or "communicating objects".

The development relates more particularly to supplying such equipment with energy, and in particular to choosing the energy conversion elements used to convert an ambient energy, present in the environment of the piece of equipment, into energy useable to power at least partially the piece of equipment.

More generally, the development relates to any piece of equipment cooperating with at least one energy conversion element capable of capturing an ambient energy in order to be able to operate. Such a piece of equipment can be fixed (a weather station, for example) or mobile (a car, for example).

DESCRIPTION OF THE RELATED TECHNOLOGY

The use of connected objects is an increasingly common practice. Such objects can be used, for example, to perform calculation operations, relay measurements provided by a sensor, etc.

These objects can be used in various ways: some can operate on an ad hoc basis and others on a regular basis, some have significant processing capacity and others do not, some perform tasks that consume computing power and others do not, etc.

As a result, not all connected objects require the same energy supply.

Furthermore, the energy supply differs depending on the objects. Some objects can be powered by the power grid, others run on batteries, and others themselves generate the energy they need to operate. For example, some objects can operate by capturing energy from one or more renewable energy sources. However, for some renewable energies, the amount of energy that can be produced at a given moment can vary greatly over time, in a more or less predictable way.

In this highly variable environment, it is common practice to oversize either the energy production capacity of these objects (such as solar panels, wind turbines, etc.) or their energy storage capacity (batteries) in order to reduce the risk that the object runs short of energy.

However, this solution is not always satisfactory, as it can increase the size of the object, its production cost, its end-of-life processing cost (sorting, recycling, destruction . . . ), etc.

There is therefore a need for a new technique for managing the supply of connected objects with energy which does not have all the disadvantages of the prior art.

SUMMARY

The development proposes a solution for managing the supply of connected objects with energy, in the form of an energy management method implemented by an electronic device, comprising:

- obtaining at least one value of ambient energy of a first type, representative of an exposure of a first piece of equipment to ambient energy;
- providing at least one recommendation relating to at least one candidate conversion element suitable for converting an ambient energy of the first type into energy of a second type useable to power the first piece of equipment, said at least one recommendation taking into account said at least one obtained value of ambient energy of said first type.

For example, in at least some embodiments, said method comprises:

- obtaining at least one value of ambient energy of a first type, representative of an exposure of a first piece of equipment to said ambient energy;
- providing at least one notification suitable for a rendering on a user interface coupled to said device and relating to at least one candidate conversion element suitable for converting an ambient energy of said first type into energy of a second type useable to power said first piece of equipment, said at least one notification taking into account said at least one obtained value of ambient energy of said first type.

The proposed solution thus analyses the conditions of use of the first piece of equipment (for example a first connected object), on the basis of at least one value of ambient energy, and generates a recommendation (for example, a notification) on an energy conversion element, intended to cooperate with the first piece of equipment, adapted to the conditions of use (or profile) of the first piece of equipment.

An energy conversion element is used to convert energy of a first type that the conversion element captures from its environment (also referred to as ambient energy) into energy of a second type. For example, an energy conversion element is a photovoltaic cell or panel that converts solar energy into electrical energy useable to power the first piece of equipment.

Such a method can in particular be implemented by the first piece of equipment. As a variant, such a method can be implemented by another piece of equipment, for example a smartphone, a computer, another connected object, a gateway, in the cloud, etc.

By way of example, the ambient energy of the first type can belong to the group comprising:

- a solar energy,
- a wind energy,
- a hydraulic energy,
- a thermal energy,
- a chemical energy,
- a microwave energy,
- a magnetic energy,
- a mechanical energy,
- a kinetic energy,
- etc.

In at least one embodiment, the development proposes to analyse the ambient energy available automatically and to select one or more energy conversion elements that help improve the supply of the first piece of equipment with energy. This is an improvement based on hardware modularity, since the energy conversion element(s) cooperating with the first piece of equipment are acted upon directly.

According to at least one embodiment, obtaining at least one value of ambient energy of the first type implements a measurement of said at least one energy value of the first type by means of at least one first sensor located on the first piece of equipment.

Thus, once the first piece of equipment is in position for use, it is possible to measure the ambient energy that it captures from its surroundings. In particular, the energy value measured can vary depending on where the piece of equipment is positioned (indoors, outdoors, behind a window, in a corner, etc.) and on the orientation of the piece of equipment (first sensor more or less oriented towards the energy source, for example).

Several sensors of the same type can be provided (i.e. measuring the same type of energy), but oriented and/or positioned differently, in order to capture the ambient energy in various directions.

According to the above example according to which the energy conversion element is a photovoltaic cell, the first sensor is, for example, a light sensor.

According to at least one embodiment, obtaining at least one value of ambient energy of the first type implements a reception of said at least one energy value of the first type from a second piece of equipment.

Thus, according to this embodiment, a second piece of equipment, for example a second connected object, preferably located close to the first piece of equipment or used in the same conditions of use as the first piece of equipment, can be fitted with a sensor and used to measure at least one energy value of the first type, and transmit this value to the electronic device. As a variant, the second piece of equipment can be a network node, a gateway, a remote server, etc., capable of collecting information relating to the ambient energy to which the first piece of equipment is exposed, and transmitting it to the electronic device.

Thus, in the above example where the energy conversion element is a photovoltaic cell, the second piece of equipment can be a meteorology server having measurements of the sunshine to which the first piece of equipment is exposed.

It should be noted that the above embodiments can be combined when several values of ambient energy are obtained: some values can be measured by the first sensor located on the first piece of equipment, and other values can be obtained from a second piece of equipment.

In particular, the method according to the development comprises obtaining at least one item of time information associated with said at least one energy value of the first type.

Such an item of time information, also known as a "timestamp", can be used in particular to timestamp the various energy values obtained, and thus to construct a history of values or profile of the first piece of equipment.

According to a first example, said at least one energy value of the first type is obtained over a first time range. Thus, it is possible to construct a history of values over a time range, for example 2 hours, 24 hours, a week, a season, etc.

According to a second example, said at least one energy value of the first type is obtained in real time.

In at least some embodiments, said candidate conversion element is selected from a plurality of conversion elements based on the efficiency of said plurality of conversion elements with said value of ambient energy.

Thus, once the energy value(s) has/have been obtained, it is possible to choose at least one conversion element meeting a selection criterion, for example offering an efficiency greater than a first value (such as a threshold), definable by configuration for example, for these energy values (for example a maximised efficiency for these energy values).

According to at least one embodiment, the method further comprises transmitting said at least one energy value of the first type to a third piece of equipment and receiving at least one of said at least one candidate conversion element.

According to this embodiment, the energy value(s) obtained can thus be transmitted to a third piece of equipment, for example a third object, a gateway, a remote server, the cloud, etc. This third piece of equipment can identify one or more candidate conversion elements and send this information back to the electronic device. The third piece of equipment can also be the second piece of equipment mentioned above. In this case, it is not necessary to transmit the energy value(s) to the second piece of equipment if they are already known to this second piece of equipment.

As a variant, at least one of said at least one candidate conversion element is obtained directly by the electronic device, for example by accessing a database that is stored in the electronic device or remote.

These two embodiments can in particular be combined. It is therefore possible to obtain at least one candidate conversion element from a third piece of equipment and at least one candidate conversion element locally.

According to at least one embodiment, said at least one candidate conversion element takes into account a proximity between at least one energy conversion characteristic of said at least one candidate conversion element and said at least one energy value of the first type.

Thus, a conversion element can be selected as a candidate conversion element if it has a particular energy conversion characteristic for the obtained energy values, for example an efficiency greater than a first value (such as a threshold) (for example, a maximum efficiency).

According to one embodiment, the at least one recommendation also takes into account at least one item of information from at least one second sensor.

For example, in at least some embodiments, said at least one notification also takes into account at least one item of information from at least one second sensor.

In other words, the selection of a conversion element as a candidate conversion element can be refined by taking into account values measured by several sensors.

For example, such a second sensor may be of a different type compared to the first sensor. The second sensor may be a temperature sensor and/or a light spectrum sensor and/or a pressure sensor, etc.

Of course, if several sensors are provided, some may be of the same type and others of different types. In at least one embodiment, said method comprises providing said recommendation (for example, said at least one notification) on at least one output interface coupled to said electronic device. In particular, said at least one recommendation takes into account at least a first conversion element used to power said first piece of equipment.

For example, in at least some embodiments, said at least one notification takes into account at least one first conversion element used to power said first piece of equipment. Thus, it may be possible according to the development to verify whether the first conversion element, which cooperates with the first piece of equipment, corresponds to a candidate conversion element. If this is the case, it may not be necessary to replace it. Otherwise, it is advisable to replace it with a candidate conversion element, or to modify the position and/or orientation of the first piece of equipment, or to add at least one other conversion element, etc.

To do this, the method implements, for example, obtaining at least one characteristic of at least one first conversion element used by said first piece of equipment. This characteristic can be obtained in various ways, for example by prior configuration of said at least one first conversion element, on the basis of at least one item of information provided by the current conversion element, by using an automatic detection system, etc.

According to at least one embodiment, said at least one recommendation takes into account the positioning of the electronic device and/or said at least one first sensor and/or said at least one second sensor, when obtaining said at least one energy value of said first type.

For example, in at least some embodiments, said at least one notification takes into account the positioning of said electronic device and/or said at least one first sensor and/or said at least one second sensor when obtaining said at least one energy value of said first type.

According to at least one embodiment, said at least one recommendation (for example, said at least one notification) takes into account a context of use of the first piece of equipment.

For example, said recommendation (for example, said at least one notification) is constructed taking into account energy values obtained during a particular time range, for example, only during the day, or taking into account a particular temperature range, for example in the order of 20° C.+/−5°, etc.

In other words, only part of the energy value history can be used to construct a recommendation (for example, a notification). Alternatively, certain energy values can be filtered to construct a recommendation (for example, a notification).

According to at least one embodiment, said at least one recommendation belongs to the group comprising:

- a recommendation to change a conversion element commonly used by said first piece of equipment (for example, by issuing a notification requiring the change of a first conversion element currently used to power the first piece of equipment),
- a recommendation to replace a conversion element commonly used by the first piece of equipment with one of said at least one candidate conversion element,
- a recommendation relating to a type of ambient energy to be converted,
- a recommendation relating to a type and/or model of conversion element to be used,
- a recommendation to position at least one conversion element on the first piece of equipment,
- a recommendation relating to a number of conversion elements to be used on the first piece of equipment,
- a recommendation relating to a position and/or orientation of said first piece of equipment etc.

For example, in at least some embodiments, said at least one notification belongs to the group comprising:

- a notification recommending to change at least one conversion element commonly used by said first piece of equipment,
- a notification recommending to replace at least one conversion element commonly used by said first piece of equipment with one of said at least one candidate conversion element,
- a notification recommending at least one type of ambient energy to be converted,
- a notification recommending at least one type and/or model of conversion element to be used,
- a notification recommending at least one positioning of at least one conversion element on said first piece of equipment,
- a notification recommending a number of conversion elements to be used on said first piece of equipment,
- a notification recommending at least one position and/or orientation of said first piece of equipment. According to at least one embodiment, the first piece of equipment has at least two faces, each cooperating with at least one conversion element. The previous steps of obtaining at least one value of ambient energy and providing at least one recommendation (for example, said at least one notification) can be implemented for each of said conversion elements.

According to the embodiments, the various characteristics relating to the method according to the development may be combined or taken separately.

Furthermore, the development relates to a corresponding electronic device. Such a device implements at least one processor configured to:

- obtain at least one value of ambient energy of a first type, representative of an exposure of a first piece of equipment to ambient energy;
- provide at least one recommendation relating to at least one candidate conversion element suitable for converting an ambient energy of the first type into energy of a second type useable to supply the first piece of equipment with energy, said at least one recommendation taking into account said at least one obtained value of ambient energy of the first type.

For example, in at least some embodiments, said at least one processor is configured to:

- obtain at least one value of ambient energy of a first type, representative of an exposure of a first piece of equipment to said ambient energy;
- provide at least one notification relating to at least one candidate conversion element suitable for converting an ambient energy of said first type into energy of a second type useable to power said first piece of equipment, said at least one notification taking into account said at least one obtained value of ambient energy of said first type. Such a device is in particular suitable for implementing the steps of the method previously described in any of its embodiments. Such a device could, of course, comprise the various characteristics relating to the method according to the development, which may be combined or taken separately. Thus, the characteristics and advantages of this device are the same as those of the method. Therefore, they are not detailed further.

As previously indicated, such a device is, for example, the first piece of equipment, or another piece of equipment (computer, smartphone, other connected object, gateway, etc.).

In at least some embodiments, said notification is provided via a communication module of said electronic device.

In at least some embodiments, said notification is provided via an output user interface of said electronic device.

One embodiment of the development also aims to protect one or more computer programs comprising instructions suitable for implementing the method according to at least one embodiment of the development as described above, when this or these program(s) is/are executed by a processor, as well as at least one computer-readable information medium comprising instructions of at least one computer program as mentioned above.

BRIEF DESCRIPTION OF THE DRAWINGS

Other characteristics and advantages of the development will emerge more clearly upon reading the following description of at least one embodiment, provided as a simple illustrative non-restrictive example, and the annexed drawings, wherein.

DETAILED DESCRIPTION OF CERTAIN ILLUSTRATIVE EMBODIMENTS

General Principle

The context of the development is that of a first piece of equipment exposed to at least one ambient energy, for example a solar, wind, hydraulic, thermal, vibratory, kinetic, etc., energy, enabling to power it or to recharge its batteries, totally or partially.

Such a piece of equipment can be placed in various environments, particularly indoors or outdoors. Depending on the location of this piece of equipment, the available ambient energy can vary greatly. The development proposes a recommendation (for example, notification) technique to help improve the capture of the ambient energy available in the environment in which the first piece of equipment is placed.

Figure 1:
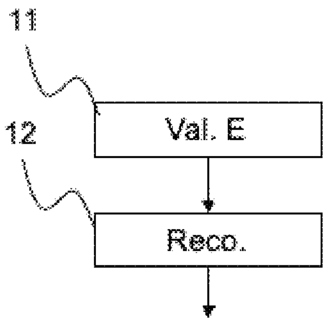
FIG. 1 shows the main steps of a method according to at least one embodiment of the development.

FIG. 1 illustrates the general principle of the development, implemented in an electronic device. In particular, such a piece of equipment can communicate with the first piece of equipment, or be the first piece of equipment.

Such a device can in particular obtain 11 at least one value of ambient energy value of a first type, representative of an exposure of the first piece of equipment to an ambient energy. For example, the value(s) of ambient energy can be measured by means of a first sensor located on the first piece of equipment. As a variant, the value(s) of ambient energy can be obtained by a second piece of equipment and transmitted to the electronic device. Possibly, at least one value can be measured by the first piece of equipment and at least one other value obtained from a second piece of equipment.

In particular, the value(s) of ambient energy can be associated with an item of time information, in order to construct a history of values or a profile of the first piece of equipment in its environment.

The value(s) of ambient energy obtained during the obtaining step 11 can be used to generate 12 at least one recommendation relating to at least one candidate conversion element suitable for converting ambient energy of the first type into energy of a second type useable to power the first piece of equipment.

In other words, the device can determine a group of at least one candidate conversion element meeting a selection criterion for the obtained value(s) of ambient energy (for example, meeting an efficiency criterion) and/or provide a recommendation relating to at least one of these candidate conversion elements.

For example, the device can verify whether a current conversion element used by the first piece of equipment to convert ambient energy of the first type into energy of a second type, also referred to as a first conversion element, belongs to the group of at least one candidate conversion element (i.e. whether the first conversion element is of the same type and/or model and/or category as a candidate conversion element and/or has technical information, in terms of efficiency for example, similar to that of at least one candidate conversion element), and provide a recommendation or take an action following this verification.

More generally, a recommendation generated during step 12 of providing at least one recommendation belongs to the group comprising:

- a recommendation to change a conversion element commonly used by the first piece of equipment (i.e a conversion element currently used by the first piece of equipment),
- a recommendation to replace a conversion element commonly used by the first piece of equipment with one of said at least one candidate conversion element,
- a recommendation relating to a type of ambient energy to be converted,
- a recommendation relating to a type and/or model of conversion element to be used,
- a recommendation to position at least one conversion element on the first piece of equipment,
- a recommendation relating to a number of conversion elements to be used on the first piece of equipment,
- a recommendation relating to a position and/or orientation of the first piece of equipment,
- etc.

In this way, it is possible to inform a user that the performance obtained with at least one conversion element cooperating with the first piece of equipment can potentially be improved, and possibly to suggest replacing the current conversion element with one of the candidate conversion elements, to suggest modifying the position and/or orientation of the current conversion element or of the first piece of equipment, etc.

It is also possible to choose a conversion element directly from the candidate conversion elements when assembling the conversion element with the first piece of equipment.

Use of at Least One Conversion Element Such as a Photovoltaic Cell or Panel

By way of illustration, it is considered hereafter that the first piece of equipment cooperates with at least one conversion element for converting ambient energy generated by luminosity (sun, artificial lighting-illuminance) into electrical energy powering the first piece of equipment. A conversion element according to this example therefore comprises at least one photovoltaic cell.

Again, it is recalled that the ambient light intensity is not the same depending on whether the first piece of equipment is placed, or moved, in front of a window in full sunlight, above a piece of furniture, or in a meeting room without windows, lit only by fluorescent lamps, depending on the day/night cycle, etc. The energy production from a photovoltaic cell is therefore affected by the position and/or orientation of the photovoltaic cell and/or the piece of equipment, as well as by the environment.

Figure 2A:
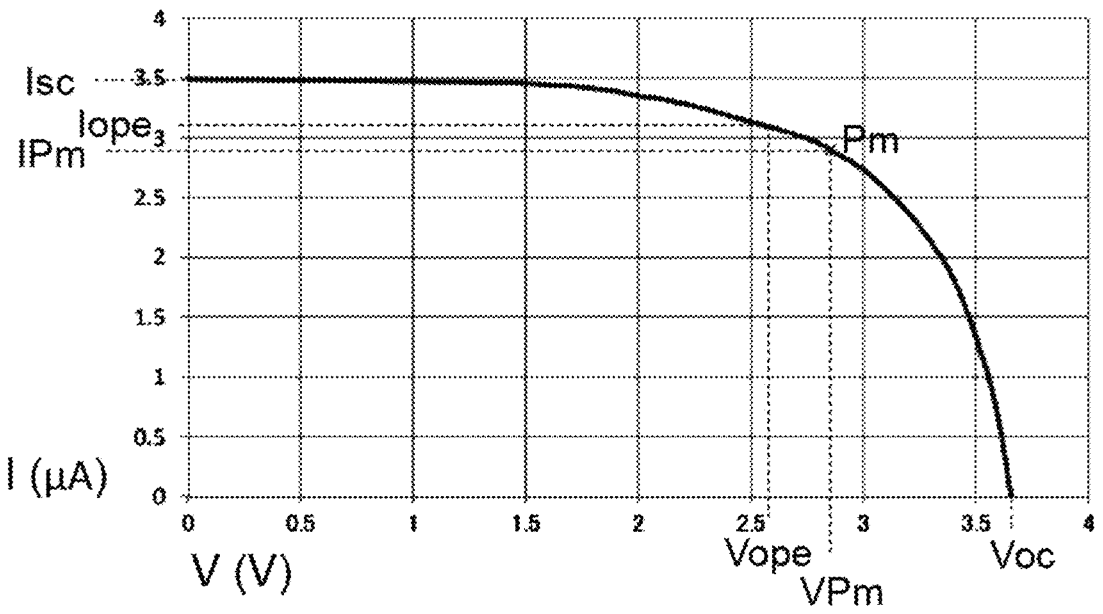
FIG. 2A illustrates the characteristics of a photovoltaic panel in terms of voltage and current production.

By way of example, FIG. 2A illustrates the characteristics of a photovoltaic panel comprising six photovoltaic cells, in terms of voltage and current production, for a light flux of 200 lux (where lux is the international unit for measuring luminosity), with a lighting under a fluorescent lamp FL (neon).

The open circuit voltage, also known as Voc, is the voltage supplied by the photovoltaic panel when it is not delivering electricity. In this case, no current flows (I=0 μA and Voc=3.6V).

The short-circuit current, also known as Isc, is the current supplied by the photovoltaic panel when it is short-circuited. In this case, the voltage is zero (Isc=2.5 μA and V=0V).

In operation, the efficiency of this photovoltaic panel is at its maximum for a light flux of 200 lux, with a lighting under a fluorescent lamp FL, and enables a voltage Vope of 2.6V to be produced with a current Iope of 3.1 μA.

| 200 LX FL | | | |
|---|---|---|---|
| Voc(V) | Isc(μA) | Vope(V) | Iope(μA) |
| 3.6 | 3.5 | 2.6 | 3.1 |

Such a photovoltaic panel used in another environment (i.e. with a light flux other than 200 lux and/or with a lighting other than a lighting under a fluorescent lamp FL, such as a LED bulb or solar rays, for example) would not achieve this maximum efficiency (operation in "degraded" mode).

Figure 2B:
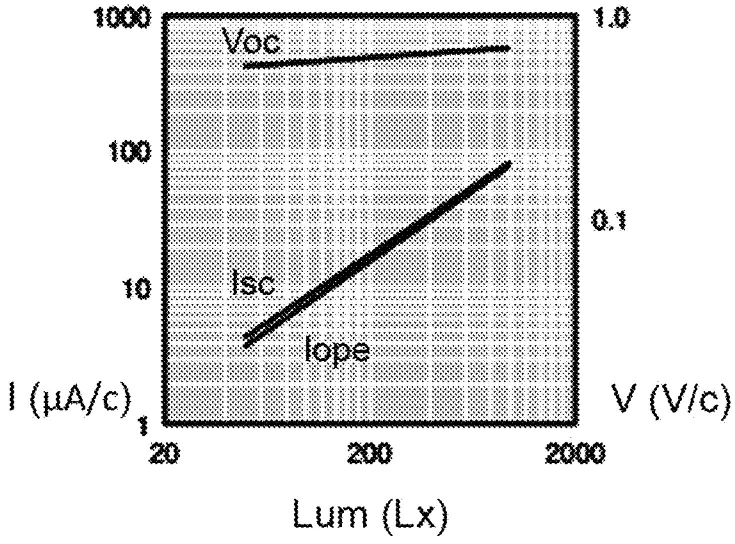
FIG. 2B shows the relationship between luminosity and the voltage and current produced by a converter element.

As illustrated in FIG. 2B, there is therefore a relationship between luminosity and the voltage/current produced by a photovoltaic panel. As each photovoltaic cell/panel has its own characteristics, the choice of the photovoltaic cell/panel should take into account the environment in which it will be used.

According to the development and according to this embodiment, it is therefore sought to obtain at least one luminosity value (i.e. the ambient energy) to which the first piece of equipment is exposed, and to provide a recommendation relating to the photovoltaic panel(s) (i.e. candidate conversion elements) suitable for converting luminosity into a voltage/current useable to supply the first piece of equipment with energy.

For example, it is sought to connect to the first piece of equipment the photovoltaic panel(s) that enable an efficiency greater than a first value (such as a threshold) to be achieved. According to at least one embodiment, the photovoltaic panel(s) that capture(s) more energy (for example, a maximum amount of energy) and thus offer(s) the first piece of equipment more power (for example, a maximum power, such as the power Pm in FIG. 2A, corresponding to a maximum current IPm and a maximum voltage VPm) in the surrounding environment is/are selected. It should be noted that the maximum power, which maximises the energy captured, corresponds to the peak power that a photovoltaic panel can provide under ideal conditions. Operational power refers to the power actually developed by the panel during long-term use.

In particular, if the first piece of equipment is moved from a first location to a second location, it is possible to provide a new recommendation relating to the photovoltaic panel(s) to be used to capture a first level of energy.

It is thus possible to replace at least one conversion element of the first piece of equipment with a candidate conversion element selected by taking into account the obtained values of ambient energy, in particular following a change in the position and/or orientation of the conversion element or of the first piece of equipment, or a change of environment (installation of a curtain on a window, for example), so that the selected candidate conversion element a priori captures more energy than the at least one conversion element to be replaced in its new position, orientation and/or environment (under the same overall conditions of exposure to the ambient energy).

The various steps implemented by an electronic device according to the development, according to at least one embodiment implementing at least one conversion element for converting the ambient energy generated by the ambient luminosity into electrical energy for powering the first piece of equipment, are described below in relation to FIG. 3.

Analysis of the Environment

According to at least one embodiment, it is considered that the first piece of equipment is connected to at least a first conversion element of the photovoltaic panel type used to power the first piece of equipment. For example, such a first piece of equipment is a piece of equipment with assembled functional modules as described in the French patent application FR2014136 filed on 24 Dec. 2020 on behalf of the same Applicant.

According to at least one embodiment, the electronic device is also considered to be the first piece of equipment. As a variant, as described in relation to the general principle, the electronic device can be a piece of equipment distinct from the first piece of equipment.

A) First Sensor: Light Sensor

Figure 3:
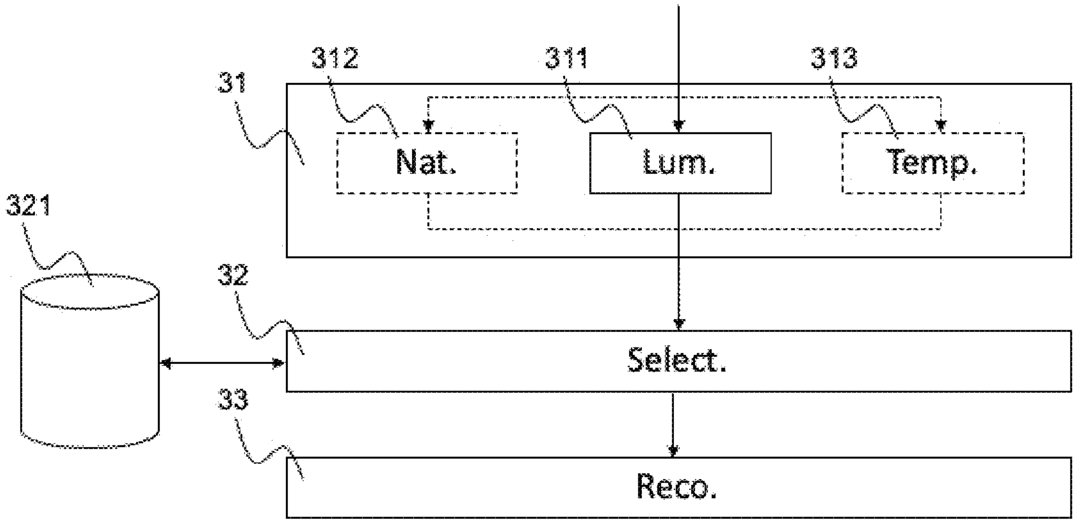
FIG. 3 illustrates an example of the implementation of the development with one conversion element such as a photovoltaic panel.

According to the embodiment illustrated in FIG. 3, it is considered that the first piece of equipment is equipped with at least a first sensor for measuring ambient luminosity. As a variant, as described in relation to the general principle, the value(s) of ambient energy can be obtained by a second piece of equipment and transmitted to the electronic device. Possibly, at least one value can be measured by the first piece of equipment and at least one other value obtained from a second piece of equipment. Values of ambient luminosity can thus be obtained from local and/or remote sensors.

Thus, as illustrated in FIG. 3, the first piece of equipment can, once it is placed in condition of use, perform an analysis 31 of its environment, and measure/obtain 311 at least one value of ambient luminosity. The first piece of equipment thus has an initial level of knowledge of the environment in which it is placed.

For example, the first piece of equipment can obtain 311 at least one of the following values:

the current luminosity, the lowest luminosity, the highest luminosity, the average luminosity, etc.

Such values are measured in lux, for example.

The current luminosity can in particular be obtained in real time. The lowest, highest or average luminosity can in particular be obtained over a time range, or under particular conditions of use (light on in the room in which the first piece of equipment is located or light off, shutters open or closed, etc.).

These values can, for example, be stored in a database. An item of time information (date and/or time of day) can possibly be added to measured values.

The first piece of equipment (or more generally the electronic device) can thus obtain a profile of the ambient light intensity according to, for example, the use of the room, the time of day, the season, or any other need/requirement.

In particular, the first piece of equipment can be equipped with a single light sensor, or with several light sensors equipping, for example, on various faces of the first piece of equipment.

In at least one embodiment, this analysis 31 of the environment also enables the first piece of equipment (or more generally the electronic device) to exclude certain luminosity values, for example isolated values (values distant from the other values), values obtained over a time range during which it is not necessary for the first piece of equipment to operate nominally (at night in an office, for example), etc. This exclusion of certain values can be defined by configuration, by implementing a post-processing filtering, by implementing a dynamic analysis of the first piece of equipment's behaviour, etc.

As presented below, the luminosity values obtained can in particular be used to generate a recommendation relating to at least one candidate photovoltaic cell/panel (or more generally relating to at least one candidate conversion element).

B) Second Sensor: Light Spectrum Sensor, Temperature Sensor, Etc.

As illustrated in FIG. 3, the step of analysing 31 the environment may optionally be supplemented by other values obtained from at least one second sensor (which may be located on the first piece of equipment or remote). The first piece of equipment thus has an improved level of knowledge of the environment in which it is placed.

According to a first example, the first piece of equipment can carry at least one sensor such as a spectrometer, for measuring the light spectrum and identifying the nature of the light source (sunlight, LED bulb, fluorescent bulb, etc.). Thus, the first piece of equipment can measure or obtain 312 at least one value relating to the ambient light spectrum, and identify the nature of the corresponding light source on its own.

Indeed, the wavelength of the light depends on the light source. The light spectrum is therefore different depending on the sources: the sun, a LED bulb or a fluorescent bulb, for example, do not have the same light spectrum. However, the spectral sensitivity of photovoltaic cells, i.e. the spectrum in which they can produce energy efficiently, can differ from one type of cell to another.

According to this first example, in addition to obtaining values of ambient luminosity, the first piece of equipment (or more generally the electronic device) can obtain information on the nature of the light source present thanks to at least one second sensor such as a spectrometer. In particular, it may be possible to discriminate the type of light/nature of the light source by detecting only certain light peaks specific to various light sources: solar spectrum, white LED, fluorescent tube, halogen or incandescent bulb, for example.

According to a second example, which may possibly be combined with the first example, the first piece of equipment can carry at least one temperature sensor. Thus, the first piece of equipment can measure or obtain 313 at least one value relating to the ambient temperature.

Indeed, the energy production of photovoltaic cells can vary depending on the temperature of the environment. For example, at a constant light flux of 200 lux (corresponding to the light emitted by a neon light), there is a direct relationship between the voltage and current produced by a photovoltaic cell and the temperature of the environment. The higher the temperature, the greater the impact on the voltage and current produced by the photovoltaic cell.

As presented below, the information on the nature of the light source and/or the temperature may in particular be used when generating a recommendation relating to at least one candidate photovoltaic cell/panel.

Selection of at Least One Candidate Conversion Element

At the end of the analysis step 31, the first piece of equipment (or more generally the electronic device) can generate 33 at least one recommendation (for example, a notification) relating to at least one selected candidate conversion element 32.

To do this, a group of at least one candidate conversion element meeting a selection criterion can be selected during a selection step 32.

For example, the determination of a group of at least one candidate conversion element can implement a transmission at least some of the values obtained during the analysis step 31 (value(s) of ambient luminosity, and possibly temperature value(s) and/or nature of the light source) to a third piece of equipment. On the basis of this information, the third piece of equipment can identify the reference(s) (for example, the type and/or model and/or category and/or characteristics) of the photovoltaic cells/panels that can produce energy under these conditions of use, and send back to the first piece of equipment (or more generally to the electronic device) at least one identification element (reference, type, model etc.) of a candidate conversion element. To do this, the third piece of equipment can, for example, use an algorithm or access a database to select the reference(s) of the candidate photovoltaic cells/panels.

As a variant, the first piece of equipment (or the electronic device) can directly implement an algorithm or access a database, for example, to obtain the reference(s) of the photovoltaic cells/panels capable of producing energy under these conditions of use.

Returning to FIG. 3, the reference 321 illustrates, for example, a database to which one of the previously mentioned pieces of equipment can connect to select the reference(s) of the candidate photovoltaic cells/panels. Such a database 321 can be local (for example, embedded in the piece of equipment), remote or distributed. It can notably be stored in the cloud.

For example, the selection criterion can make it possible to select 32 a candidate conversion element whose efficiency, in operation under the conditions of use obtained during the analysis step 31, is greater than a first threshold.

In order to select a candidate conversion element, the database 321 can contain, for example:

- technical information relating to the candidate conversion element, taken for example from the manufacturer's technical specification sheets (such as the maximum power Pm, the maximum current IPm, the maximum voltage VPm, the voltage/current curves, etc.),
- abacuses illustrating the relationships between the voltage and current produced, and the temperature, for various luminosity values for the candidate conversion element,
- abacuses illustrating the relationships between the voltage and current produced, for various luminosity values for the candidate conversion element,
- at least one luminosity value enabling the candidate conversion element to operate correctly,
- the nature of the expected light source (solar radiation, fluorescent lamp, halogen, LED, etc.) in relation to the luminosity value(s) required for the candidate conversion element to operate correctly,
- abacuses illustrating the relationships between the voltage and current produced, for various temperature values for the candidate conversion element, at least one temperature value enabling the candidate conversion element to operate correctly, any other information useful for analysing the values obtained and selecting one or more candidate conversion elements suitable for the current use of the first piece of equipment.

Thus, a candidate conversion element can be selected by taking into account a proximity between at least one energy conversion characteristic of the candidate conversion element and the value(s) obtained in analysis step 31.

By way of example, the database 321 can store the reference abacuses of the photovoltaic cells adapted to a certain level of luminosity (such as that illustrated in FIG. 2A for example) and/or temperature. For example, for an average luminosity of 200 lux, the most suitable photovoltaic cell (for example, the one with the best efficiency) is type A; for an average luminosity of 500 lux, it is type B; for an average luminosity of 1,000 lux, it is type C; for an average luminosity of 5,000 lux, it is type D; for an average luminosity of 10,000 lux, it is type E; for an average luminosity of 30,000 lux, it is type F, etc.

Such abacuses, which can be defined at a finer level, can for example be provided by the photovoltaic cell manufacturer (since it can, by construction, create photovoltaic cells specific to certain ranges of luminosity and/or temperature), by the supplier of the first piece of equipment or of another piece of equipment according to the development, etc.

According to the embodiment illustrated in FIG. 3, it is possible to identify the reference(s) of photovoltaic cells that are suitable (for example optimal) for operating in the luminosity conditions of the first piece of equipment.

In particular, if the analysis of the environment 31 makes it possible to obtain knowledge of the nature of the light flux/light source, it is possible to refine the selection of the photovoltaic cells by using abacuses taking into account the luminosity and nature of the light flux. In this way, it is possible to select one or more conversion elements adapted to both the luminosity and the nature of the light flux used to supply the first piece of equipment with energy.

Similarly, if the analysis of the environment 31 makes it possible to obtain knowledge of the ambient temperature, it is possible to refine the selection of the photovoltaic cells by using abacuses taking into account the luminosity and the temperature. In this way, it is possible to select one or more conversion elements adapted to both the luminosity and the temperature to supply the first piece of equipment with energy.

In particular, the selection 32 of the conversion element(s), and consequently the recommendation(s), can in particular take into account the positioning of the electronic device and/or of the first sensor(s) and/or of the second sensor(s) when obtaining the luminosity value(s).

Generation of at Least One Recommendation

Once the candidate conversion element(s) has/have been identified, at least one recommendation can be generated in a step 33.

For example, if at least one first conversion element already equips the first piece of equipment, the first piece of equipment (or more generally the electronic device) can verify whether the first conversion element corresponds to a candidate conversion element (i.e. has the same model, type, reference, characteristic, etc., as a candidate conversion element).

To do this, the first piece of equipment can have information relating to at least one characteristic of the first conversion element(s). Such information is for example:

obtained by prior configuration (software or hardware), supplied by the first conversion element (voltage, current, etc.), obtained from a complementary detection technique, obtained by any other means.

For example, a complementary detection technique is based on the use of one or more magnetic potentiometric sensors on at least one internal face of the conversion element, which, associated with a magnet positioned differently on the internal faces, returns a different resistance value and makes it possible to determine the type of conversion element used. Such a technique is notably described in the French patent application 2107036 filed on 30 Jun. 2021 on behalf of the same Applicant.

In some embodiments, if the first conversion element (current conversion element) corresponds to a candidate conversion element, no action may be required. Possibly, a notification can be generated (via a communication module and/or an output user interface) to inform the user that the first conversion element is suitable for energy conversion in relation to the conditions of use of the first piece of equipment. Said at least one recommendation therefore takes into account at least a first conversion element used to power the first piece of equipment.

Otherwise (or if no conversion element already equips the first piece of equipment), a recommendation for the candidate conversion element(s) can be provided.

In particular, a user and/or a piece of equipment according to the development can be informed (for example by a notification sent via a communication module and/or on a user interface) of the references of the candidate conversion element(s). For example, information can be rendered on a user interface of the first piece of equipment (belonging to or coupled to this first piece of equipment) or a user interface belonging to or coupled to other another piece of equipment communicating with the first piece of equipment via a communication network (proximity node, system in the cloud, smartphone via a dedicated application or not, etc.) informing of the possibility to use a candidate conversion element, or recommending to replace a first conversion element with a candidate conversion element.

When a candidate conversion element is used to supply the first piece of equipment with energy, the first piece of equipment can be informed of a replacement of the first conversion element with a candidate conversion element, recommended to improve the energy capture of the first piece of equipment from its environment. The first piece of equipment device can, for example, receive at least one item of information relating to this replacement via an input user interface belonging to or coupled to the first piece of equipment, or via a communication module of the first piece of equipment (from an input user interface of a remote piece of equipment, for example).

The first piece of equipment may also be capable of detecting autonomously that a current conversion element has been replaced with a candidate conversion element. For example, such a technique is notably described in the above-mentioned French patent application 2107036 filed on 30 Jun. 2021. In particular, such a technique can make it possible, at least in some embodiments, to determine the reference of the new conversion element used to supply the first piece of equipment with energy and/or to compare it with the reference of the candidate conversion element.

Other recommendations can also be provided, in some embodiments, such as a recommendation relating to the positioning of at least one conversion element on the first piece of equipment, a recommendation relating to a number of conversion elements to be used on the first piece of equipment, a recommendation relating to a position and/or orientation of the first piece of equipment, etc.

Example of a First Piece of Equipment

As indicated above, the first piece of equipment is for example a piece of equipment with assembled functional modules as described in the above-mentioned French patent application FR2014136 filed on 24 Dec. 2020.

Figure 4:
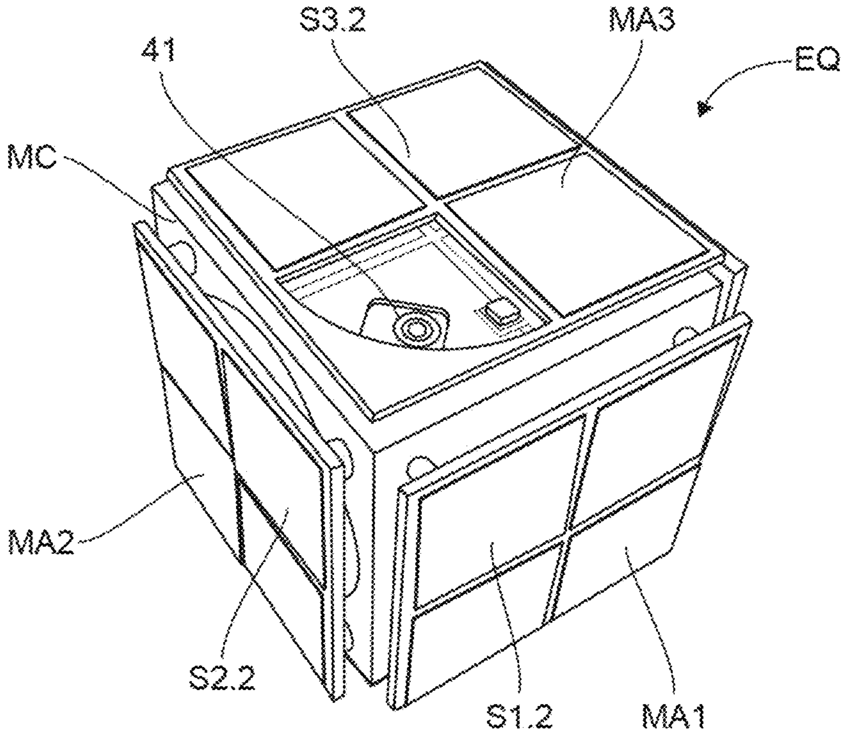
FIG. 4 illustrates an example of a first piece of equipment with assembled functional modules.

Such a first piece of equipment EQ is notably illustrated in FIG. 4 in an assembled state. The assembled piece of equipment EQ comprises a cubic core module MC (therefore with six faces) and at least three additional modules MA1, MA2 and MA3.

The first modules MA1, MA2 and MA3 each have two faces, a first, inner face, which is assembled to a second, outer face, S1.2, S2.2, S3.2. The outer face S1.2 of the additional module MA1 comprises photovoltaic cells grouped into photovoltaic panels covering its surface.

The first piece of equipment, or at least one additional module of the first piece of equipment, comprises at least a first sensor 41 for measuring the light intensity of the environment in which the piece of equipment is located.

Hereinafter, the expression "face of the first piece of equipment" is used to designate a face of the first piece of equipment or an external face of an additional module of the first piece of equipment.

In order to avoid the first sensor to be inadvertently positioned face down on the ground or against a wall, for example, de facto distorting the analysis of the ambient light, it is possible to provide several first sensors, located on different faces of the first piece of equipment. In at least one embodiment, a first sensor for measuring light intensity can be provided on each of the faces of the first piece of equipment. Similarly, one or more second sensors (for example, temperature sensor, light spectrum sensor, etc.) can be provided on one or more faces of the first piece of equipment.

In this way, it is possible to help improve the supply of the various faces of the first piece of equipment carrying photovoltaic cells with solar energy. In particular, it is possible to:

- detect the light intensity received in several directions in space,
- identify the current, weakest, strongest and/or average light intensity for all or certain faces of the object/spatial directions,
- etc.

By analysing the various values obtained, it is possible to create an accurate model of the evolution of the light environment surrounding the first piece of equipment over a time range, for example over the course of a day, season, etc.

According to at least one embodiment, by integrating sensors on various faces carrying photovoltaic cells, the development thus enables the first piece of equipment to obtain luminosity values for these various faces, and therefore to obtain finer analysis data for different spatial directions. In this way, a different recommendation can be provided for each of the directions/surfaces of the first piece of equipment. In particular, it is possible to replace individually at least one energy conversion element of a first reference with an energy conversion element of a second reference in order to be able to capture more energy for the operation of the first piece of equipment.

The various faces of the first piece of equipment can then carry photovoltaic cells with different characteristics, selected taking into account the ambient light environment in which the first piece of equipment is located: for example, at least one face can carry one or more photovoltaic cells adapted to capture direct sunlight (if this face faces a window, for example), at least one face can carry one or more photovoltaic cells suitable for capturing artificial light (LED, fluorescent lamp, halogen, etc.) (if this face faces the ceiling, for example), and possibly at least one face can carry one or more photovoltaic cells suitable for capturing low-intensity light (if this face faces a wall, for example).

It is thus possible to improve the energy supply capacity by using, on the first piece of equipment, photovoltaic cells/panels with different characteristics, each photovoltaic cell/panel being adapted to the luminosity conditions of its environment.

The proposed solution can therefore be implemented with a variable number and/or position of the faces of the first piece of equipment.

Variants

The case where the ambient energy of a first type obtained is a light intensity has been described above. As a variant, in some embodiments, other types of ambient energy can be considered. For example, mechanical vibrations can power at least one energy conversion element such as an electrostatic or electromagnetic generator or a piezoelectric element. The magnetic fields can power at least one energy conversion element such as an induction coil. Hydraulic or wind energy can power at least one energy conversion element such as a current generator, etc.

Furthermore, it is possible to use several energy conversion elements allowing to convert a different type of energy on the same piece of equipment (for example an element for converting a solar energy and an element for converting a wind energy). In some embodiments, at least one conversion element can be selected independently of the other conversion elements, based on information obtained from appropriate sensors.

In other words, the proposed solution can be applied, in certain embodiments, to any piece of equipment that can operate by capturing, from its environment, all or part of the energy required to power it, regardless of the energy source(s). The light sensors described above can notably be replaced with or supplemented by hydraulic pressure sensors, or any other type of suitable sensor. Again, sensors of different types or sensors of the same type positioned/oriented differently can be used to refine the analysis of the environment.

Thus, in at least one embodiment, the proposed solution makes it possible to select the energy conversion elements adapted to the environment, i.e. making it possible to obtain an efficiency greater than a first value (such as a threshold).

The process described above can in particular be implemented several times (for example regularly) to verify that the conversion elements used are still suitable for the environment. It can also be implemented when a change in position and/or orientation of the first piece of equipment is detected, in order to help improve energy capture in the new environment of the piece of equipment.

In particular, the first piece of equipment can be a piece of mobile equipment, for example a car. For example, such a piece of mobile equipment can be equipped with a regenerative braking system, enabling kinetic energy to be converted into another energy, such as a hydraulic or electrical energy. The braking values obtained can thus be used to generate at least one recommendation relating to a regenerative braking system to be used. For example, when driving in the mountains, as the brakes are more solicited than when driving on the plains, it is possible to inform the driver and/or the piece of mobile equipment (for example, by a notification sent via a communication module and/or on a user interface) that another regenerative braking system would be better suited to the current situation, and/or to replace the system in use automatically with a regenerative braking energy system better suited to the current situation.

Electronic Device

Figure 5:
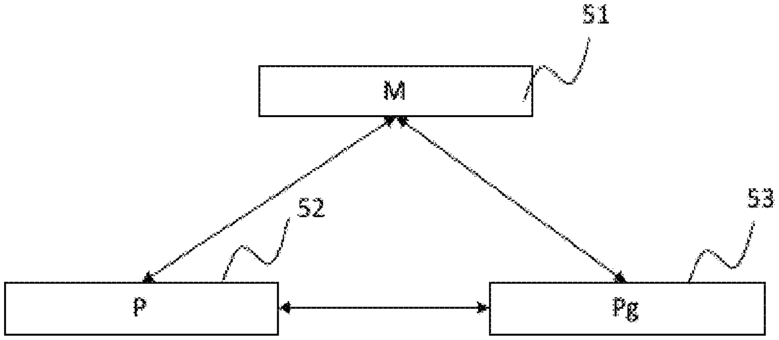
FIG. 5 is a simplified view of an electronic device according to at least one embodiment of the development.

Finally, a description is given, in relation to FIG. 5, of the simplified structure of an electronic device according to at least one embodiment of the development.

As illustrated in FIG. 5, an electronic device according to one embodiment of the development comprises a memory 51, a processing unit 52, equipped for example with a programmable computing machine or a dedicated computing machine, for example a processor P, and controlled by the computer program 53, implementing steps of the method according to at least one embodiment of the development.

At initialisation, the code instructions of the computer program 53 are for example loaded into a RAM memory before being executed by the processor of the processing unit 52.

The processor of the processing unit 52 implements steps of the previously described method, according to the instructions of the computer program 53, to:

obtain at least one value of ambient energy of a first type, representative of an exposure of a first piece of equipment to ambient energy;

provide at least one recommendation relating to at least one candidate conversion element suitable for converting an ambient energy of the first type into energy of a second type useable to supply the first piece of equipment with energy, the recommendation(s) taking into account said at least one obtained value of ambient energy of the first type.

The invention claimed is:

1. A method of managing energy implemented by an electronic device, the method comprising:

obtaining at least one value of ambient energy of a first type, representative of an exposure of a first piece of equipment to the ambient energy; and providing at least one notification suitable for a rendering on a user interface coupled to the device and relating to at least one candidate conversion element suitable for converting an ambient energy of the first type into energy of a second type useable to power the first piece of equipment, the at least one notification taking into account the at least one obtained value of ambient energy of the first type, the providing comprising:

an identifying step in which at least one particular candidate conversion element is identified, and a recommending step in which the at least one identified candidate conversion element is recommended to a user of the electronic device.

2. The method according to claim 1, wherein the obtaining of at least one value of ambient energy of the first type implements a measurement of the at least one energy value of the first type by means of at least one first sensor located on the first piece of equipment.

3. The method according to claim 1, wherein the obtaining of at least one value of ambient energy of the first type implements a reception of the at least one energy value of the first type from a second piece of equipment.

4. The method according to claim 1, wherein the method comprises obtaining at least one item of time information associated with the at least one energy value of the first type.

5. The method according to claim 1, wherein the method comprises transmitting the at least one energy value of the first type to a third piece of equipment and receiving at least one of the at least one candidate conversion element.

6. The method according to claim 1, wherein at least one candidate conversion element takes into account a proximity between at least one energy conversion characteristic of the at least one candidate conversion element and the at least one energy value of the first type.

7. The method according to claim 1, wherein the at least one notification also takes into account at least one item of information from at least one second sensor.

8. The method according to claim 1, wherein the at least one notification takes into account at least one first conversion element used to power the first piece of equipment.

9. The method according to claim 1, wherein the at least one notification takes into account the positioning of the electronic device and/or the at least one first sensor located on the first piece of equipment configured to measure the at least one energy value of the first type and/or the at least one second sensor providing at least one item of information when obtaining the at least one energy value of the first type.

10. The method according to claim 1, wherein the at least one notification belongs to a group comprising:

a notification recommending to change at least one conversion element commonly used by the first piece of equipment, a notification recommending to replace at least one conversion element commonly used by the first piece of equipment with one of the at least one candidate conversion element, a notification recommending at least one type of ambient energy to be converted, a notification recommending at least one type and/or model of conversion element to be used, a notification recommending at least one positioning of at least one conversion element on the first piece of equipment, a notification recommending a number of conversion elements to be used on the first piece of equipment, and a notification recommending at least one position and/or orientation of the first piece of equipment.

11. The method according to claim 1, wherein the candidate conversion element is selected from a plurality of conversion elements based on the efficiency of the plurality of conversion elements with the value of ambient energy.

12. An electronic device comprising at least one processor configured to:

obtain at least one value of ambient energy of a first type, representative of an exposure of a first piece of equipment to the ambient energy; and provide at least one notification relating to at least one candidate conversion element suitable for converting an ambient energy of the first type into energy of a second type useable to power the first piece of equipment, the at least one notification taking into account the at least one obtained value of ambient energy of the first type, the provide step comprising:

identify at least one particular candidate conversion element, and recommend the at least one identified candidate conversion element to a user of the electronic device.

13. The electronic device according to claim 12, wherein the notification is provided via a communication module of the electronic device.

14. The electronic device according to claim 12, wherein the notification is provided via an output user interface of the electronic device.

15. The electronic device according to claim 12, configured to implement a measurement of the at least one energy value of the first type by means of at least one first sensor located on the first piece of equipment when obtaining at least one value of ambient energy of the first type.

16. The electronic device according to claim 12, configured to implement a reception of the at least one energy value of the first type from a second piece of equipment when obtaining of at least one energy value of the first type.

17. The electronic device according to claim 12, configured to obtain at least one item of time information associated with the at least one energy value of the first type.

18. The electronic device according to claim 12, configured to transmit the at least one energy value of the first type to a third piece of equipment and receiving at least one of the at least one candidate conversion element.

19. A non-transitory computer-readable data medium comprising instructions of at least one computer program suitable for implementing, when the computer program is executed by a processor, a method of managing energy implemented by an electronic device, comprising:

obtaining at least one value of ambient energy of a first type, representative of an exposure of a first piece of equipment to the ambient energy; and providing at least one notification suitable for a rendering on a user interface coupled to the device and relating to at least one candidate conversion element suitable for converting an ambient energy of the first type into energy of a second type useable to power the first piece of equipment, the at least one notification taking into account the at least one obtained value of ambient energy of the first type, the providing comprising:

an identifying step in which at least one particular candidate conversion element is identified, and a recommending step in which the at least one identified candidate conversion element is recommended to a user of the electronic device.

* * * * *